United States Patent

Roming et al.

(10) Patent No.: US 8,910,908 B2
(45) Date of Patent: Dec. 16, 2014

(54) TWO-PIECE STIFFENING ELEMENT

(75) Inventors: Thorsten Roming, Himmelpforten (DE); Thorsten Schroeer, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1042 days.

(21) Appl. No.: 11/980,899

(22) Filed: Oct. 31, 2007

(65) Prior Publication Data

US 2008/0128550 A1 Jun. 5, 2008

Related U.S. Application Data

(60) Provisional application No. 60/855,594, filed on Oct. 31, 2006.

(51) Int. Cl.
*B64D 1/06* (2006.01)
*B64C 1/06* (2006.01)
*B64C 1/00* (2006.01)

(52) U.S. Cl.
CPC .......... *B64C 1/061* (2013.01); *B64C 2001/0081* (2013.01)
USPC ............................................. 244/119; 52/846

(58) Field of Classification Search
CPC .............. B64C 2001/0072; B64C 2001/0081; B64C 1/06; B64C 1/12
USPC ................ 244/119, 131–133, 158.1, 117 R, 244/123.1–123.9, 124; 52/846
See application file for complete search history.

(56) References Cited

U.S. PATENT DOCUMENTS

| | | | | |
|---|---|---|---|---|
| 497,253 A | * | 5/1893 | Reynolds | 52/846 |
| 2,098,752 A | * | 11/1937 | Miller | 244/131 |
| RE21,921 E | * | 10/1941 | Greulich | 52/838 |
| 4,452,657 A | * | 6/1984 | Hamm | 244/119 |
| 5,688,426 A | * | 11/1997 | Kirkwood et al. | 219/633 |
| 6,364,250 B1 | * | 4/2002 | Brinck et al. | 244/119 |
| 6,511,570 B2 | * | 1/2003 | Matsui | 244/119 |
| 6,718,713 B2 | * | 4/2004 | McKague et al. | 52/309.13 |
| 7,100,885 B2 | * | 9/2006 | Zerner | 248/503.1 |
| 7,281,685 B2 | * | 10/2007 | Schoene | 244/118.6 |
| 7,494,092 B2 | * | 2/2009 | Brenner et al. | 244/119 |
| 8,056,859 B2 | * | 11/2011 | Kunichi et al. | 244/123.1 |
| 8,093,531 B2 | * | 1/2012 | Kocik et al. | 219/121.64 |
| 2004/0040252 A1 | * | 3/2004 | Beral et al. | 52/729.3 |
| 2005/0211844 A1 | * | 9/2005 | Ricaud | 244/122 R |

* cited by examiner

*Primary Examiner* — Joshua J Michener
*Assistant Examiner* — Matthew J Smith
(74) *Attorney, Agent, or Firm* — Greer, Burns & Crain Ltd.

(57) ABSTRACT

The invention provides a stiffening element, in particular for a shell component of an aircraft or spacecraft, which has a stiffening profile part and a foot part. The stiffening profile part is in this case composed of a lightweight metal material, and the foot part is composed of a material which is highly resistant to corrosion. A method is also provided for production of a stiffening element, in particular for a shell component of an aircraft or spacecraft. A stiffening profile semi-finished product is first of all produced from a lightweight metal material, and a foot part is produced from a material which is highly resistant to corrosion. The foot part and the stiffening profile semi-finished product are then integrally connected. The stiffening profile semi-finished product together with the foot part is then subjected to machining to form an intended shape for the stiffening element.

9 Claims, 3 Drawing Sheets

(A)

TWO-PIECE STIFFENING ELEMENT

CROSS-REFERENCE TO RELATED APPLICATIONS

This application claims the benefit of U.S. Provisional Application No. 60/855,594, filed Oct. 31, 2006, the entire disclosure of which is herein incorporated by reference.

FIELD OF THE INVENTION

The present invention relates to a stiffening element for an aircraft or spacecraft, and to a method for production of a stiffening element such as this for an aircraft or spacecraft.

BACKGROUND OF THE INVENTION

Although applicable to any desired stiffening elements, the present invention and the problems on which it is based will be explained in more detail with reference to frames for stiffening a fuselage shell of an aircraft.

Fuselage shells for aircraft are normally produced using a so-called lightweight structure from an outer skin, which is reinforced on the inside by a two-dimensional structure composed of stringers, which run in the longitudinal direction of the aircraft, and frames, which run transversely with respect to the longitudinal direction of the aircraft, as stiffening elements.

In this case, aluminum and aluminum alloys have been used for decades as the conventional material for the outer skin, stringers and frames. However, these are increasingly being replaced by fiber composite materials, in particular by carbon-fiber-reinforced plastic (CFRP) since they make it possible to reduce the total weight of the aircraft, and therefore to use less energy during flight, with an aircraft fuselage with the same stiffness and strength. Further advantages of fiber composite materials over aluminum materials are little material fatigue and the absence of corrosion.

However, the processing of fiber composite materials requires techniques which often differ fundamentally from the techniques used for processing aluminum materials. By way of example, aluminum frames for fuselage sections of different diameter can be produced by bending an extruded profile to the respective desired curvature, after which it is milled to the precise intended shape. However, a large number of lamination apparatuses, in each case of appropriately different forms, must be provided to produce correspondingly differently shaped frames composed of carbon-fiber-reinforced plastic, in which apparatuses fiber mats can be draped and can be laminated using epoxy resin in the respectively desired intended shape. In addition to increased investments costs, this involves considerable logistic effort, resulting in high production costs.

In order to allow the total weight of the aircraft to be reduced by the large-scale use of carbon-fiber-reinforced plastic, while at the same time restricting the production costs, it is therefore worthwhile to use frames composed of an aluminum material in conjunction with an outer skin and/or stringers composed of carbon-fiber-reinforced plastic. This results in the problem of there being an electrochemical potential between the aluminum and the carbon-fiber-reinforced plastic, leading to corrosion on the aluminum side if the two materials make contact.

SUMMARY OF THE INVENTION

An object of the present invention is therefore to provide an improved stiffening element with the aim being, in particular, to achieve a permanent and corrosion-resistant connection to a structure which needs to be stiffened and is composed of a fiber composite material, with low weight and low production costs.

A stiffening element is accordingly provided, in particular for a shell component of an aircraft or spacecraft, comprising a stiffening profile part and a foot part. The stiffening profile part is in this case composed of a lightweight metal material, and the foot part of a material which is highly resistant to corrosion.

A method is also provided for production of a stiffening element, in particular for a shell component of an aircraft or spacecraft. The method steps will be described briefly in the following text. First of all, a stiffening profile semi-finished product is produced from a lightweight metal material, and a foot part is produced from a material which is highly resistant to corrosion. The foot part and the stiffening profile semi-finished product are then integrally connected. The stiffening profile semi-finished product together with the foot part is then subjected to machining to form the intended shape of the stiffening element.

The idea on which the present invention is based is to produce a hybrid stiffening element which combines in it the advantages of the lightweight metal material and the material which is highly resistant to corrosion. Since the foot part which is placed on the structure to be stiffened is composed of the material which is highly resistant to corrosion, there is no risk of corrosion. At the same time, the fact that the stiffening profile part is composed of a lightweight metal material ensures that the stiffening function of the stiffening element is achieved with little weight, with the capability to process a metal easily, thus resulting in correspondingly lower-cost production. The method according to the invention also ensures that the stiffening element can be manufactured to a precise intended shape.

Advantageous refinements and improvements of the invention are contained in the dependent claims.

According to one embodiment, the foot part is a profile part, in particular an L-shaped or T-shaped profile part. This makes it possible to achieve a permanent connection, for example by adhesive bonding, to the structure to be stiffened via the foot surface of the respective profiles.

The material which is highly resistant to corrosion may be a metal material, and in particular titanium or a titanium alloy. Titanium forms a highly resistant oxidic protective layer, which effectively prevents corrosion, when in contact with the air. Since this protective layer is reformed within minutes or even seconds in the event of mechanical damage, there is also no risk of corrosion being initiated by minor mechanical damage. The high mechanical strength of titanium results in a permanent mechanical connection to the structure to be stiffened. Titanium is also relatively light in weight in comparison to its mechanical strength, so that this does not lead to any significant increase in the weight of the overall stiffening element.

According to a further embodiment, the lightweight metal material is aluminum or an aluminum alloy. This results in less weight than the use of a stiffening element manufactured, for example, entirely from titanium. Assuming that the aluminum frames have a normal thickness in present-day aircraft construction of about 2 mm, then, for mechanical reasons as well, despite its greater strength than aluminum, this could not be reduced significantly by using titanium, thus resulting in greater weight.

According to a further embodiment, the stiffening profile part has a groove into which the foot part is inserted. This has the advantage that a precise connection is achieved between the two parts, which reliably absorbs compression and shear forces, because of its integral nature. Since the groove and a corresponding thickened area of material on both sides of the groove are provided in the lightweight metal material, this results in a lower weight than would be the case if the geometry in the material which is highly resistant to corrosion were to be interchanged.

The stiffening profile part and the foot part may be mechanically connected to one another by an integral joint, in particular by a welded joint. This results in a permanent connection between the two parts, which can also be loaded in tension.

According to a further embodiment, a shell component is provided, in particular for an aircraft or spacecraft. The shell component comprises a skin area as well as a stiffening element according to at least one of the embodiments described above, with the stiffening element being connected to the skin area via the foot part.

This results in a low-cost shell component in which any desired materials may be chosen for the skin area, for example in order to achieve specific mechanical characteristics, without any possibility of corrosion on the connecting surface.

The skin area may be composed of a fiber composite material which, in particular, is a carbon-fiber-reinforced plastic. This embodiment is particularly advantageous, since the shell component combines a particularly low weight and low production costs with high flexibility in shaping and corrosion resistance.

According to a further embodiment, the skin area comprises at least one stringer which runs essentially at right angles to the stiffening element. In other words, the stringer and the stiffening element, which carries out the role of a frame, form a two-dimensional structure which reinforces the skin area. The stiffening element has a cutout for the stringer to pass through, which cutout is geometrically designed such that the stringer passing through it does not touch the stiffening profile part. This has the advantage that the stringer cannot come into contact with the lightweight metal material of the stiffening profile part, thus making it possible to initiate corrosion.

According to a further embodiment, the foot part of the stiffening element is connected to the stringer. This is particularly advantageous since the shell component has a high degree of mechanical stiffness as a result of the enlarged contact area between the stiffening element and the stiffened structure. At the same time, corrosion is effectively prevented since the contact is produced by the foot part, which is composed of the material which is highly resistant to corrosion.

According to one embodiment of the method according to the invention, two further method steps are provided. In one of the steps, a groove is machined out in the stiffening profile semi-finished product, to be precise by partial machining by the stiffening profile semi-finished product in the area of the groove. In the further step, the foot part is inserted into the groove. These additional steps result in more mechanical strength than that achieved by the integral connection on its own. Furthermore, the foot part is provisionally fixed by inserting it into the groove, thus making it easier to form the integral connection while avoiding the possibility of distortion during the step of integral connection.

According to one embodiment, the foot part is produced as a foot profile semi-finished product, analogously to the production of the stiffening profile part as a stiffening profile semi-finished product. The machining to the intended shape of the stiffening element in this place extends both to the stiffening profile semi-finished product and to the foot profile semi-finished product. This makes it possible to achieve a particularly precise intended shape even where the foot part is distorted during the integral connection step, since this will be compensated for completely by the final machining step.

According to one embodiment, the integral joint is produced by welding, in particular by means of a double fillet weld. This results in a joint with particularly high mechanical strength.

BRIEF DESCRIPTION OF THE DRAWINGS

The invention will be explained in more detail in the following text using exemplary embodiments and with reference to the attached figures of the drawing, in which.

In the figures, the same reference symbols denote identical or functionally identical components, unless stated to the contrary.

DETAILED DESCRIPTION OF THE INVENTION

Figure 1:
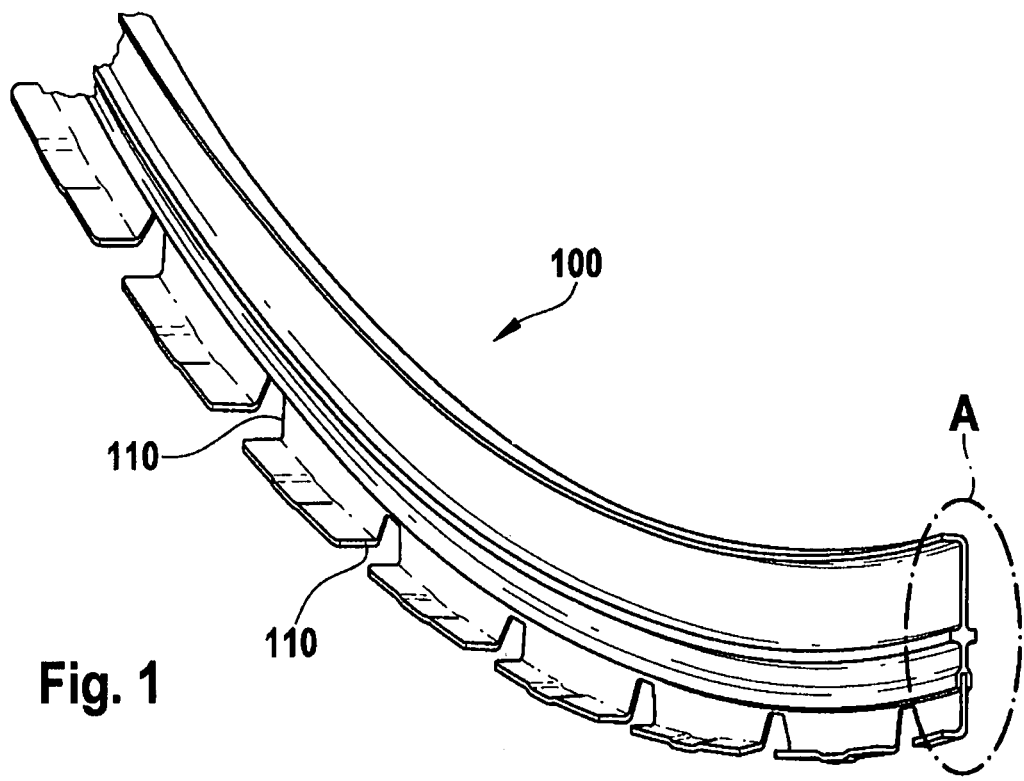
FIG. 1 shows a perspective illustration of a detail of a stiffening element according to one embodiment of the invention.

FIG. 1 shows a perspective illustration of a detail of a stiffening element according to one embodiment of the invention. The illustrated stiffening element 100 is a frame, as is suitable, by way of example, for stiffening an aircraft outer skin which is provided with stringers running essentially parallel. In this case, cutouts 110 are provided in the foot area for the stringers to pass through the frame 100.

Figure 1A:
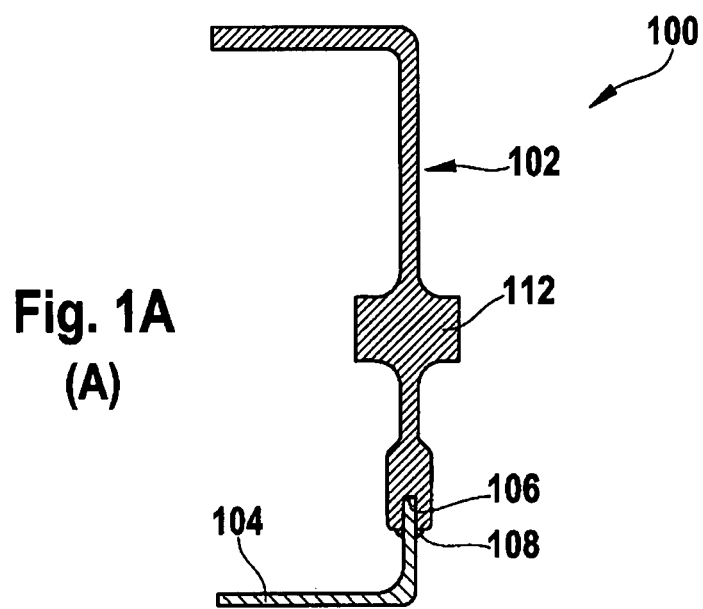
FIG. 1A shows an enlarged cross-sectional illustration from FIG. 1.

A section area A is illustrated enlarged, in the form of a cross-sectional illustration, in FIG. 1A in order to show the structure of the frame 100. As can be seen from the cross-sectional illustration, the frame 100 is composed of two parts 102, 104, which are of different colours in order to identify the different materials in the cross-sectional illustration.

A stiffening profile part 102 composed of aluminum is shown in a dark colour. This essentially has an L-shaped profile adjacent to which a stiffening strap 112 is formed in the centre of the frame profile. A groove 106 is formed adjacent to the lower edge of the stiffening profile part 102, and a foot part 104 is inserted into it.

The foot part 104 is composed of titanium and is illustrated in a light colour, in order to illustrate the material. This likewise has an "L-shaped" profile, which, in conjunction with the L-shaped profile of the stiffening profile 102, forms the stiffening element with a U-shaped profile overall. The foot part 104 is fixed to the stiffening profile part 102 by means of a welded joint with a double fillet weld 108.

Figure 2:
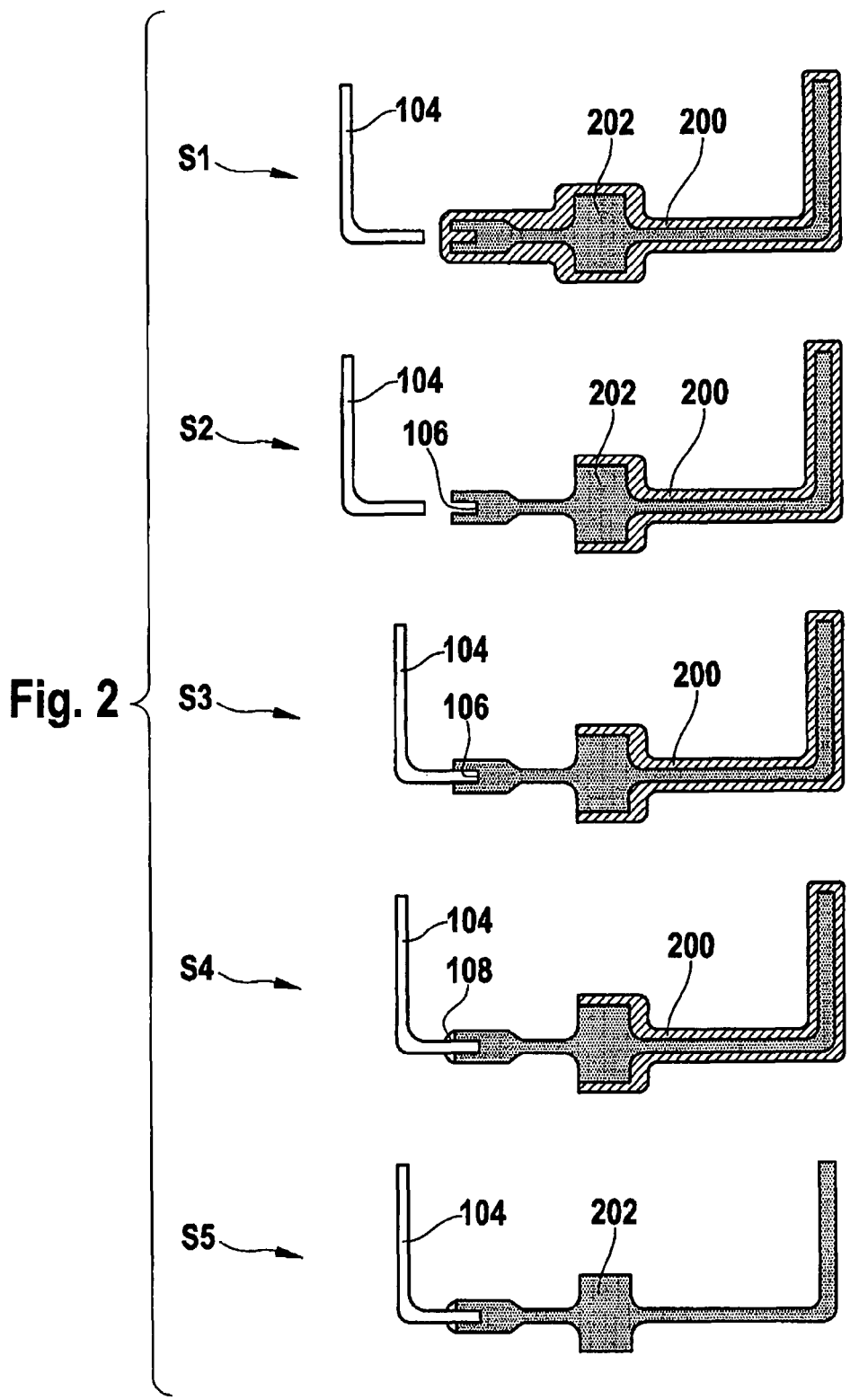
FIG. 2 shows a schematic illustration of a method for production of a stiffening element according to one embodiment of the invention.

FIG. 2 shows a schematic illustration of the steps in a method for production of a stiffening element according to one embodiment of the invention, for example of the frame shown in FIG. 1.

In a first step A, a stiffening profile semi-finished product 200 is produced from aluminum, and a foot part 104 is produced from titanium. An intended shape 202 is marked within the illustration of the stiffening profile semi-finished product 200, as a dark colour, to which shape the semi-finished product is intended to be machined, in a plurality of steps. The shaded area marks the additional area to be machined away.

In step B, a portion of the shaded additional area to be machined away from the stiffening profile semi-finished product 200 is removed. This results, in particular, in a groove 106 being provided in the intended shape 202.

In step C, the foot part 104 is inserted into the groove 106 in the partially machined stiffening profile semi-finished product 200. The foot part 104 is therefore provisionally fixed in the stiffening profile semi-finished product 200.

In step D, the foot part 104 and the partially machined stiffening profile semi-finished product 200 are welded to one another. This results in a permanent joint. In this case, the heat supplied during the welding process can lead to minor distortion, although this is not illustrated here, of the welded parts 104, 200.

In step E, the rest of the shaded additional area to be machined away is removed by final machining. During the process, the machining is carried out as far as possible such that it is oriented with the position of the foot part 104, and, using this as the basis, defines the intended shape 202. If the parts 104, 200 are distorted with respect to one another in step D, this is therefore compensated for such that the desired profile of the resulting stiffening element is achieved with high precision.

Figure 3:
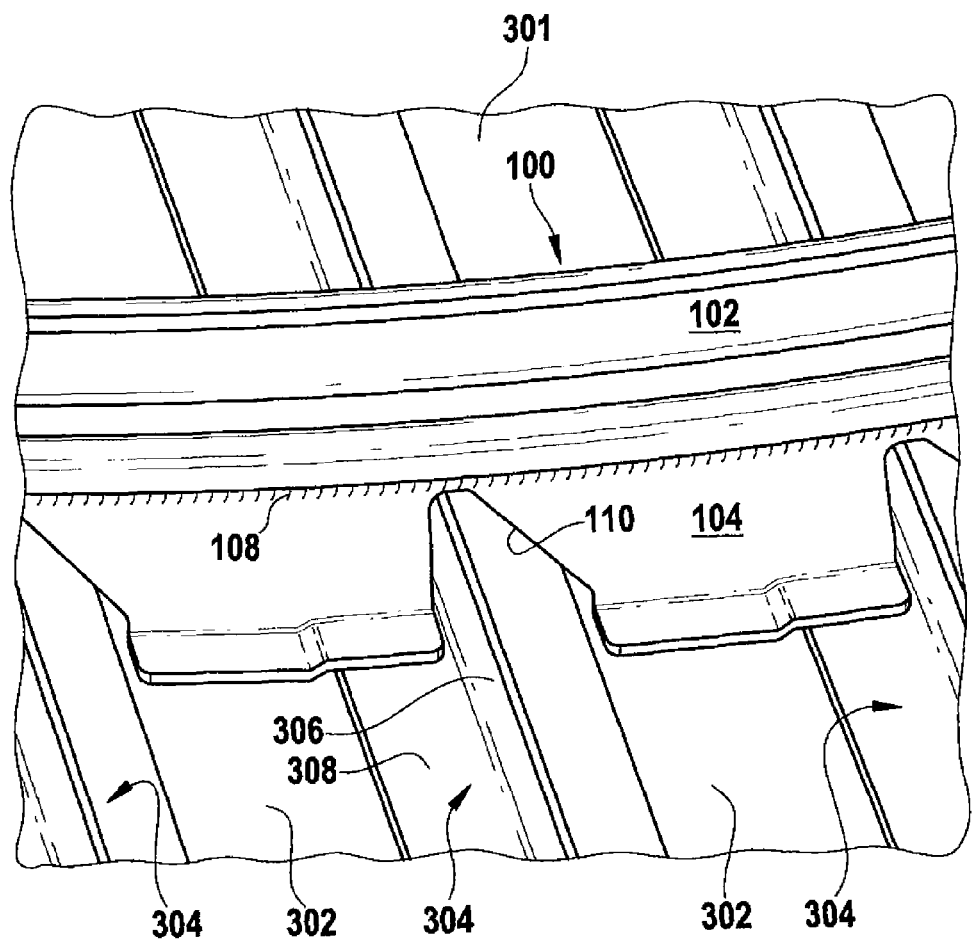
FIG. 3 shows a perspective view of a detail of the inside of a shell component according to one embodiment of the invention.

FIG. 3 shows a perspective view of a detail of an inner surface 301 of the outer skin 302 of an aircraft. Stringers 304 are mounted on the inner surface 301, running parallel and stiffening the shell component in the longitudinal direction of the aircraft. The stringers 304 are so-called T-shaped stringers, which have a foot 306, which rests on the inner surface 301 and is connected to it for example by adhesive bonding, and a web section 308, which extends essentially at right angles to the outer skin 302. Both the outer skin 302 and the stringers 304 are manufactured from carbon-fiber-reinforced plastic.

A frame 100 runs in the lateral direction with respect to the stringers 304 and is assembled in a hybrid form from a foot part 104 composed of titanium and a stiffening profile part 102 composed of aluminum. The two parts are welded to one another with a weld bead 108.

The foot part 104 is stepped such that it rests flat not only on sections for the inner surface 301 but also on foot sections 308 of the stringers 304. In this case, the foot part 104 has cutouts 110, through which the stringers 304 are passed under the frame 100. The cutouts 110 are shaped and arranged such that there is no contact between the stiffening profile part 102 and the stringers 304, thus avoiding the aluminum from being corroded by the different electrochemical potentials of the carbon-fiber-reinforced plastic and the aluminum.

Although the present invention has been described above with reference to preferred exemplary embodiments, it is not restricted to them but can be modified in many ways.

For example, the geometry of the frames and of the stringers can be modified in many ways. For instance, the foot and/or stiffening profile part may also have a T-shaped profile. It is also possible to use stringers with different profiles, for example L-shaped stringers. The cutouts in the frame for the stringers to pass through may also extend into the stiffening profile part, so that the foot part is split by the cutouts into sections that are not joined together.

The foot and stiffening profile part may be joined together in a different manner than by means of a groove, for example by means of tooth systems or pins that fit into one another.

The expression "stiffening element" relates to stiffening elements of any type, that is to say also to stringers.

What is claimed is:

1. A stiffening element for mounting onto an inner surface of a structure, comprising:
    a stiffening profile part which comprises a first metal, and
    a foot part comprising a second metal,
    wherein the stiffening element is assembled in a hybrid form;
    wherein the stiffening profile and the foot part are aligned and integrally connected to one another along their entire lengths;
    wherein the stiffening profile part is secured to the foot part so as to form a permanent connection;
    wherein the foot part is at least one of L-shaped, and T-shaped profile part;
    wherein a plurality of stringers are mounted on the inner surface of the structure and running parallel to each other in a longitudinal direction of the structure;
    wherein a plurality of cutouts in said foot part are geometrically configured such that the plurality of stringers pass through the stiffening element without being contacted by the stiffening profile part of said stiffening element, and
    wherein the foot part of the stiffening element is configured such that it rests flat on both the inner surface of the structure, and over the mounted sections of said plurality of stringers.

2. The stiffening element according to claim 1, wherein the second metal is at least one of titanium, and a titanium alloy.

3. The stiffening element according to claim 1, wherein the first lightweight metal is at least one of aluminum and an aluminum alloy.

4. The stiffening element according to claim 1, wherein the integral joint is a welded joint.

5. The stiffening element according to claim 1, wherein the structure is a shell component comprising a skin area.

6. The stiffening element according to claim 5, wherein the skin area comprises a fiber composite material.

7. The stiffening element according to claim 6, wherein the fiber composite material is a carbon-fiber-reinforced plastic.

8. The stiffening element according to claim 5, wherein the skin area comprises the at least one stringer running essentially at right angles to the stiffening element.

9. The stiffening element according to claim 5, wherein the shell component is for an aircraft or spacecraft.

* * * * *